UNITED STATES PATENT OFFICE.

FRIEDRICH STOLZ AND BAPTIST REUTER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ALKAMINESTER.

No. 820,830.   Specification of Letters Patent.   Patented May 15, 1906.

Application filed December 2, 1905. Serial No. 289,957.

*To all whom it may concern:*

Be it known that we, FRIEDRICH STOLZ, Ph. D., and BAPTIST REUTER, Ph. D., chemists, both subjects of the Emperor of Germany, residing at Höchst-on-the-Main, Germany, have invented certain new and useful Improvements in the Preparation of Alkaminesters, of which the following is a specification.

We have found new substances valuable for pharmaceutical purposes. They are the alkaminesters of alkylated aminobenzoic acids. Said compounds are obtainable by various methods; but we prefer to prepare them by esterifying alkylated aminobenzoic acids with alkamins.

The alkaminesters of alkylated aminobenzoic acids are colorless compounds, little soluble in water, readily soluble in alcohol, ether, and benzene, and of alkaline reaction on litmus. They form hydrochlorids which are readily soluble in water with a neutral reaction. When heated with alkalies or acids, these alkaminesters are decomposed into alkylated aminobenzoic acids and alkamins. They have a local anesthetic action, for which purpose the neutral reacting hydrochlorids are especially suited.

The alkaminesters of alkylated aminobenzoic acids may be prepared, for instance, as follows: twelve parts, by weight, of para-methylaminobenzoic acid are introduced while stirring and cooling with ice into fifty parts, by weight, of sulfuric acid of ninety-six per cent. strength, to which are allowed to drop ten parts, by weight, of diethylaminethanol. The mixture is heated for six hours on the water-bath and when cold is poured on ice. While cooling, it is made alkaline with ammonia and the separated oil is extracted with ether. The ethereal solution being dried with potash, there remains, after evaporating the ether, an oil, from which when heated to about 120° centigrade in a vacuum some diethylaminethanol may be eliminated. The alkaminester thus obtained is purified by transforming it into the neutral hydrochlorid readily soluble in water and alcohol, but which crystallizes from alcohol on addition of ether. It melts at 108°-109° centigrade.

The para-methylaminobenzoic acid ester of diethylaminethanol separated from said hydrochlorid is an oil which solidifies with difficulty in the cold. It is readily soluble in alcohol, ether, and benzent; soluble with difficulty in water.

Other alkamins may also be combined with other alkylated aminobenzoic acids, and thus other alkaminesters may be obtained having the same characteristic properties as above stated.

Having now described our invention, what we claim is—

1. As new products, the alkaminesters of alkylated aminobenzoic acids which are decomposed when heated with acids or alkalies into alkylated aminobenzoic acids and alkamins, being colorless compounds, little soluble in water, readily soluble in alcohol, ether and benzene, forming with hydrochloric acid readily-soluble salts of neutral reaction and having an anesthetic action free from irritating properties.

2. As new product, the diethylaminoethanolester of para-methylaminobenzoic acid, a colorless compound decomposed when heated with alkalies or acids into para-methylaminobenzoic acid and diethylaminoethanol and melting below 0° centigrade, little soluble in water, readily soluble in alcohol, ether and benzene, of alkaline reaction on litmus, forming with one equivalent of hydrochloric acid a salt the solution of which is of neutral reaction having an anesthetic effect free from irritating properties.

In testimony that we claim the foregoing as our invention we have signed our names in presence of two subscribing witnesses.

FRIEDRICH STOLZ.
BAPTIST REUTER.

Witnesses:
JEAN GRUND,
CARL GRUND.